(12) United States Patent
Benscoter et al.

(10) Patent No.: US 7,017,953 B2
(45) Date of Patent: Mar. 28, 2006

(54) TWIST LOCK ASSEMBLY

(75) Inventors: Scott J. Benscoter, Metamora, MI (US); Michael E. Skelton, Belleville, MI (US); Rocko D. Parker, Davidson, MI (US)

(73) Assignee: General Motors Corporation, Detroit, MI (US)

( * ) Notice: Subject to any disclaimer, the term of this patent is extended or adjusted under 35 U.S.C. 154(b) by 260 days.

(21) Appl. No.: 10/730,569

(22) Filed: Dec. 8, 2003

(65) Prior Publication Data

US 2005/0121912 A1    Jun. 9, 2005

(51) Int. Cl.
*F16L 21/00* (2006.01)

(52) U.S. Cl. .............. 285/401; 285/360; 285/376; 285/395

(58) Field of Classification Search .......... 285/314, 285/360, 376, 394, 395, 401, 359
See application file for complete search history.

(56) References Cited

U.S. PATENT DOCUMENTS

| | | | | |
|---|---|---|---|---|
| 117,826 | A * | 8/1871 | Smith | 425/411 |
| 348,059 | A * | 8/1886 | Schroder | 285/360 |
| 3,219,364 | A * | 11/1965 | Wooldridge | 285/5 |
| 3,480,300 | A * | 11/1969 | Teague et al. | 285/93 |
| 3,901,574 | A * | 8/1975 | Paullus et al. | 439/315 |
| 4,878,695 | A * | 11/1989 | Whitham | 285/39 |
| 5,131,693 | A * | 7/1992 | Miller | 285/364 |
| 6,481,763 | B1 * | 11/2002 | Mintz et al. | 285/360 |
| 6,698,799 | B1 * | 3/2004 | Anderson et al. | 285/139.1 |
| 2001/0013700 | A1 * | 8/2001 | Mintz et al. | 285/360 |
| 2003/0184091 | A1 * | 10/2003 | Ricard | 285/358 |
| 2004/0164553 | A1 * | 8/2004 | Smith | 285/360 |

* cited by examiner

Primary Examiner—James M. Hewitt
(74) Attorney, Agent, or Firm—Laura C. Hargitt

(57) ABSTRACT

A twist lock assembly includes an annular first flange at an open end of a first conduit attached to a fluid receiving component. The first flange has an alignment slot and at least one locking slot formed therein. A fluid conducting conduit has an annular second flange at an open end thereof. The second flange includes an alignment tab formed thereon. A locking ring rotatably mounts on the second flange and includes at least one locking tab formed thereon. When the first flange is attached to the component, the alignment tab engages the alignment slot and the at least one locking tab is aligned with the at least one locking slot. Rotating the locking ring relative to the second flange draws the first and second flanges into airtight engagement and locks the conduit to the component.

20 Claims, 3 Drawing Sheets

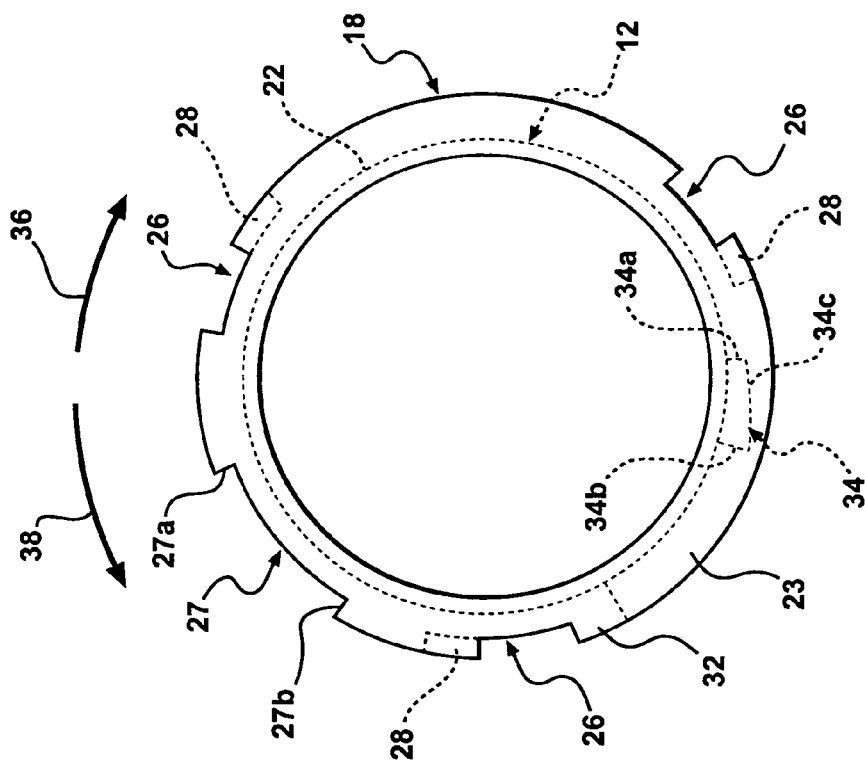
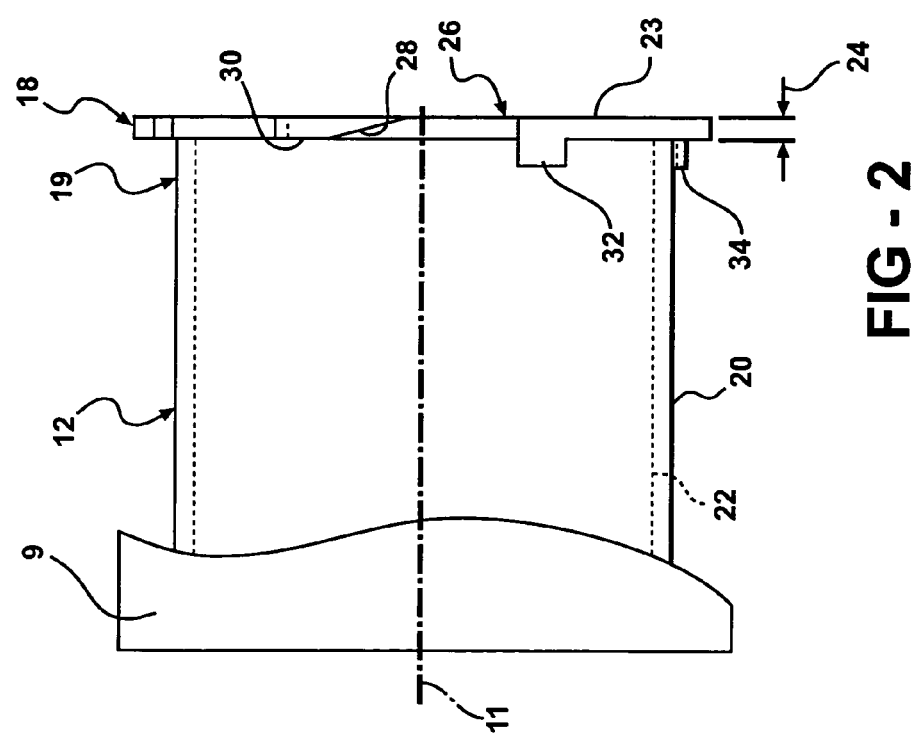

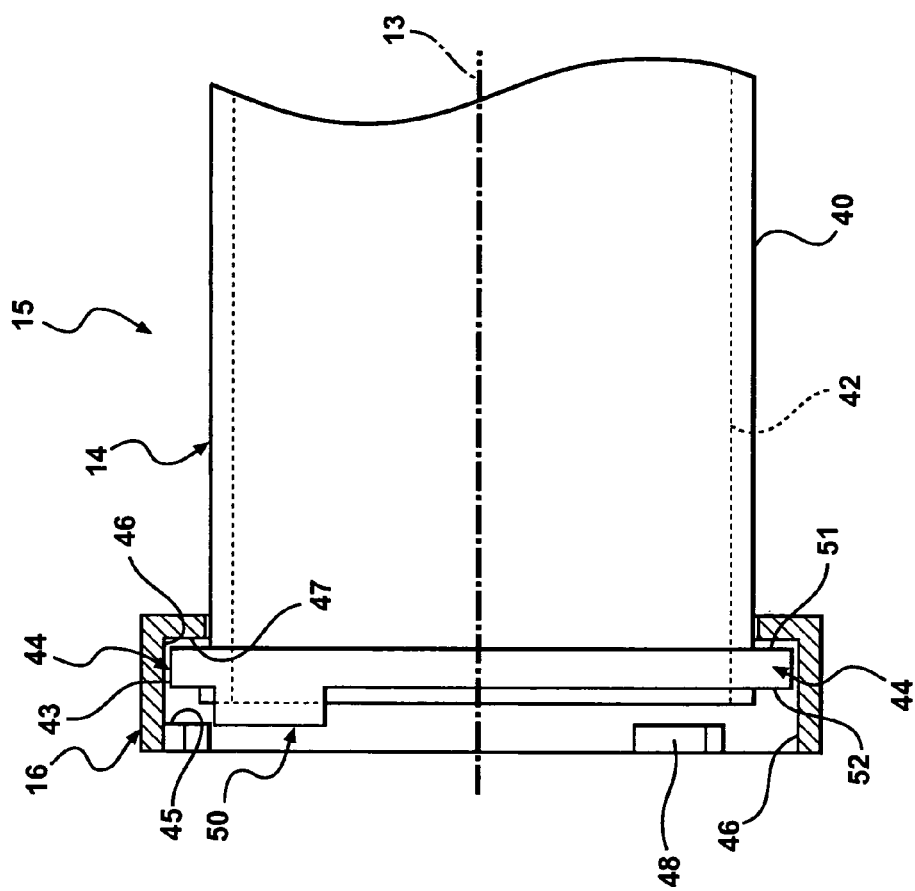
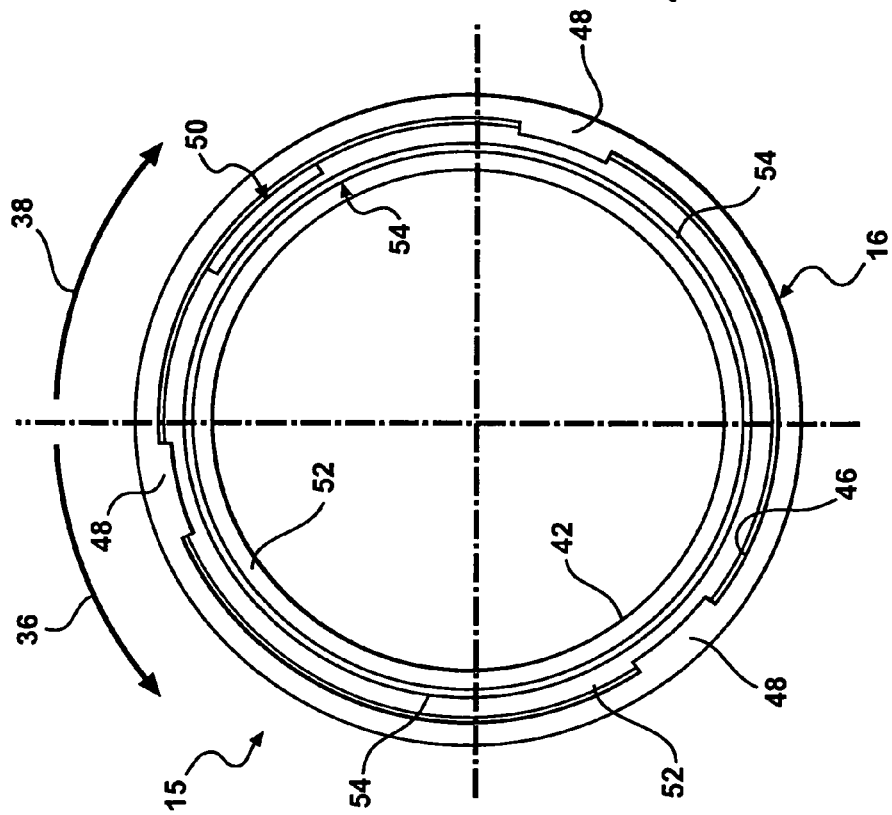

TWIST LOCK ASSEMBLY

BACKGROUND OF THE INVENTION

The present invention relates in general to air induction and distribution systems and, in particular, to a twist lock assembly for an air induction and distribution system.

Air induction and distribution systems, such as those for automotive internal combustion engines, are well known. A typical automotive internal combustion engine air induction system includes a plurality of connections between various components of the system including, but not limited to, an air cleaner assembly, a resonator, and a throttle body. The types of connections utilized typically require the use of hand tools to assemble in order to provide an airtight connection at the joints. Any connection less than an airtight connection reduces the efficiency of the air induction and distribution system.

It would be desirable to provide a means for sealing the joints on connections in an air induction and distribution system and the like that can seal the joints in an airtight manner and does not require the use of power tools or the like for assembly.

SUMMARY OF THE INVENTION

The present invention concerns a twist lock assembly for connecting a fluid conducting conduit to a fluid receiving component. The twist lock assembly includes an annular first flange adapted to be attached to a fluid receiving component and surrounding an opening in the component. The first flange has an alignment slot and at least one locking slot formed in a periphery thereof. A fluid conducting conduit having an open end includes an annular second flange attached to the open end of the conduit. The second flange includes a radially inwardly extending alignment tab formed thereon. A locking ring rotatably mounts on the second flange and includes at least one radially inwardly extending locking tab formed thereon. When the first flange is attached to the component and the first and second flanges are abutting and concentric, the alignment tab engages the alignment slot and the at least one locking tab is aligned with the at least one locking slot. Rotating the locking ring relative to the second flange draws the first and second flanges into airtight engagement and locks the conduit to the component. Preferably, a sealing bead is formed on a sealing surface of the second flange for assisting in the airtight engagement between the first and second flanges. Preferably, the locking ring is rotated approximately 110 degrees to bring the first and second flanges into airtight engagement.

The twist lock assembly in accordance with the present invention advantageously provides a greatly improved ability to prevent leakage of evaporative emissions through the joint, which provides an improved capability to meet PLEV and ZLEV emission requirements without the cost of a hydrocarbon absorber. The twist lock assembly reduces turbulence and improves the quality of the air flow path past the twist lock assembly by having the same diameter on both sides of the joint as there is no stepped surface therein and allows for shorter conduits since the flow path is not interrupted by the connection. In addition, the twist lock assembly automatically aligns the first and second flanges, eliminating the need to stretch the end of the duct over the mating part and then tightening as a separate operation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a side view of a first conduit in accordance with the present invention;

FIG. 3 is an end view of the first conduit shown in FIG. 2;

FIG. 4 is an end view of a second conduit and locking ring in accordance with the present invention;

FIG. 5 is a partial cross sectional side view of the conduit and locking ring shown in FIG. 4.

DESCRIPTION OF THE PREFERRED EMBODIMENT

Figure 1:
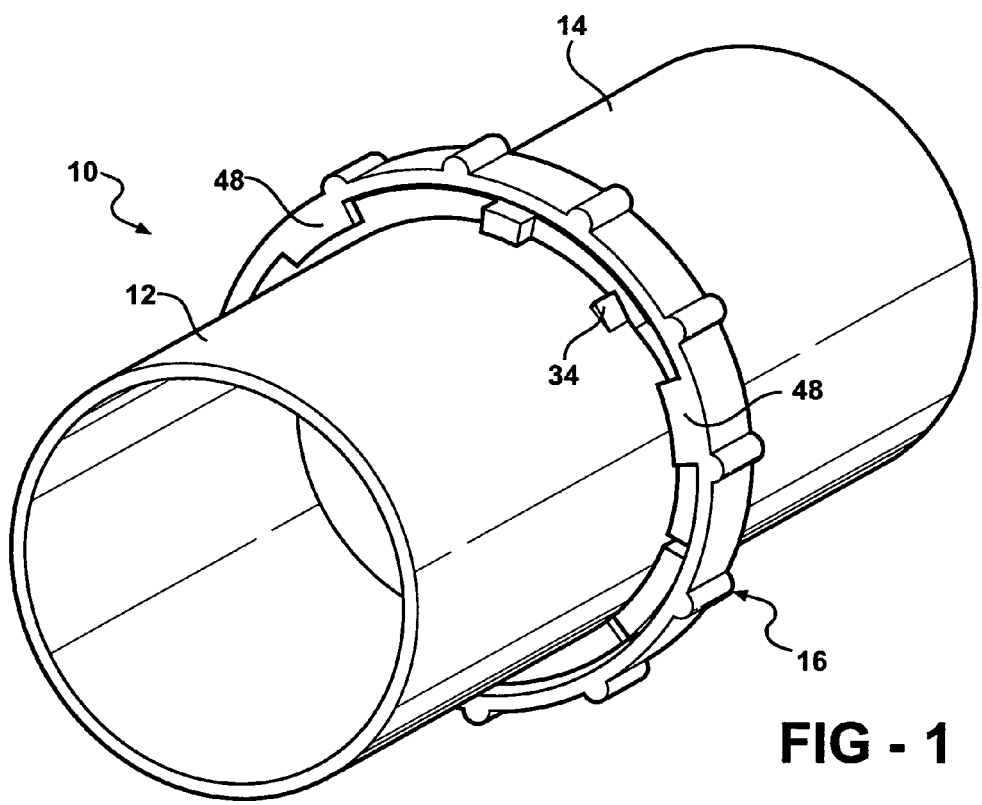
FIG. 1 is a perspective view of a partially assembled twist lock assembly in accordance with the present invention.

Referring now to FIG. 1, a twist lock assembly in accordance with the present invention is indicated generally at 10. The twist lock assembly 10 includes a first conduit 12 and a second conduit 14 having a locking ring 16 rotatably mounted thereon for assisting in the engagement of the first conduit 12 and the second conduit 14, discussed in more detail below.

Preferably the first conduit 12 is adapted to be attached to an air receiving engine component 9, best seen in FIG. 2, including, but not limited to, an air cleaner, a resonator, and a throttle body. The first conduit 12 is an air receiving conduit and the second conduit 14 is an air supplying conduit adapted to conduct the air from a source such as an air intake. Alternatively, the first 12 and second 14 conduits are any type of plumbing conduits wherein an airtight seal, discussed in more detail below, is desired for transferring fluid therebetween including, but not limited to, air filters, ducts, mass air flow meters, throttle bodies, and turbo inlets.

Referring now to FIGS. 2 and 3, the first conduit 12 is shown in a side view and an end view. The first conduit 12 includes an outside surface 20 and an inside surface 22 and is preferably constructed of a hard plastic material or similar material. The first conduit 12 includes a radially outwardly extending annular first flange 18 on an end 19 thereof. The first flange 18 includes a sealing surface 23 generally perpendicular to a longitudinal axis 11 of the first conduit 12 and an oppositely facing locking surface 30 generally parallel with the sealing surface 23. The surfaces 23 and 30 are separated by an axial thickness 24 of the first flange 18. A plurality of locking slots or apertures 26 are formed generally equidistant about a circumference of the first flange 18, each of which extends through the surfaces 23 and 30. Preferably, three locking apertures 26 are formed in the first flange 18. Intermediate a pair of the apertures 26 is formed an alignment slot 27.

A plurality of ramped surfaces 28 that correspond in number to the number of locking apertures 26 is formed in the first flange 18. Each of the ramped surfaces 28 is formed adjacent a corresponding locking aperture 26 and the ramped surfaces 28 connect the sealing surface 23 and the locking surface 30. A stop member 32 extends axially outwardly from the locking surface 30 adjacent a one of the locking apertures 26. A cam locking member 34 also extends axially outwardly from the locking surface 30 between a ramped surface 28 and the stop member 32.

Referring now to FIGS. 4 and 5, the second conduit 14 and the locking ring 16 are shown in a side view and an end view. The second conduit and the locking ring 16, when attached, form a pre-assembly, indicated generally at 15. The second conduit 14 includes an outside surface 40 and an inside surface 42 and is preferably constructed of a soft rubber material or similar material. The second conduit 14 includes a second radially outwardly extending annular flange 44 on an end thereof. The second flange 44 includes a sealing surface 52 generally perpendicular to a longitudinal axis 13 of the second conduit 14 and a surface 51 opposite the sealing surface 52. A raised annular sealing bead 54 is formed on the sealing surface 52. The sealing bead 54 is preferably an integrally formed rubber sealing member having a generally semicircular cross section similar to a sectioned O-ring. Preferably, the sealing bead 54 is situated intermediate a radially outer portion of the sealing surface 52 and a radially inner portion of the sealing surface 52. Alternatively, the sealing bead 54 only extends on a portion of the surface 52, such as at four equal arcuate intervals. An alignment tab 50 extends axially from the sealing surface 52 of the second flange 44 at a radially outer position relative to the sealing bead 54.

The locking ring 16 is preferably formed of a hard plastic material including, but not limited to the hard plastic material of the first conduit 12. The locking ring 16 is rotatably mounted on the second flange 44 of the second conduit 14 such that a radially inner surface 46 of the locking ring is spaced apart from a radially outer surface 43 of the second flange 44. The locking ring 16 includes an outer axial surface 45 and an inner axial surface 47 connected by the radially inner surface 46. Axial movement of the locking ring 16 relative to the flange 44 is constrained by the loose engagement of the surfaces 45, 46, and 47 of the locking ring and the surfaces 43, 51, and 52 of the flange 44. The locking ring 16 includes a plurality of radially inwardly extending locking tabs 48 spaced generally equidistant about a circumference thereof.

When the first conduit 12 and the second conduit 14 are to be attached to form the assembly 10, and the first flange 18 and the second flange 44 are abutting and concentric, the alignment tab 50 is placed adjacent the alignment slot 27, which also aligns the locking tabs 48 of the locking ring 16 with the locking apertures 26 of the first flange 18. The locking ring 16 is then rotated in an engaging direction 36 about the longitudinal axis 13 of the second conduit 14. The second conduit 14, however, remains stationary as the locking ring 16 is rotated because the alignment tab 50 retains the second conduit 14 in relation to the first conduit 12 by engaging with a surface 27a in the alignment slot 27.

As the locking ring 16 rotates in the engaging direction 36, the locking tabs 48 engage with the respective ramped surfaces 28, moving the locking 16 along the ramped surfaces 28 from the sealing surface 23 to the locking surface 30. The movement of the locking ring 16 also moves the sealing surface 52 of the second conduit 14 closer to the sealing surface 23 of the first conduit 12. The locking ring 16 and the sealing surface 52 have now moved toward the sealing surface 23 a distance substantially equal to the thickness 24 of the first flange 18. The sealing bead 54, therefore, is compressed between the opposed sealing surfaces 32 and 52, bringing the sealing surfaces 52 and 23 into an airtight engagement.

After the sealing surfaces 52 and 23 are brought into airtight engagement, the locking ring 16 is rotated further in the engaging direction 36 such that one of the locking tabs 48 engages with a leading edge 34a of the cam lock member 34. The leading edge 34a has a ramped surface to assist in engaging the locking tab 48. The cam lock member 34 includes a radially outer surface 34c that increases in diameter from the leading edge 34a to a trailing edge 34b. As the locking ring is rotated, the locking ring 16 deforms radially outwardly, which allows the locking tab 48 to travel along the radially outer surface 34c to a position beyond the trailing edge 34b, where the locking ring 16 returns to its original orientation and the locking tab engages with the inside surface 22. The locking tab 48 is now disposed between the cam lock member 34 and the stop member 32, which locks the locking ring 16 and second conduit 14 to the first conduit 12. The locking tab 48 disposed in this position ensures that the sealing bead 54 remains compressed and the airtight engagement between the sealing surfaces 52 and 23 remains intact.

Figure 6:
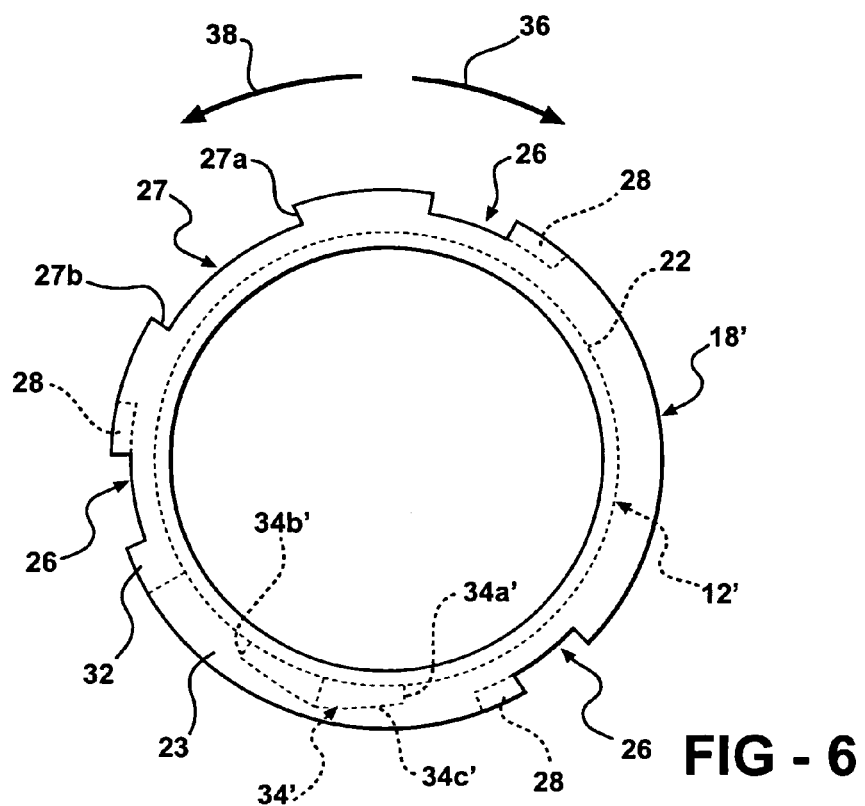
FIG. 6 is an end view of an alternative embodiment of a first conduit in accordance with the present invention.

Alternatively, the locking ring 16 and the second conduit 14 are releasably locked to the first conduit 12. There is shown in FIG. 6, an alternative embodiment of a first conduit 12' and first flange 18'. The first conduit 12' includes an elongated cam locking member 34' having a leading edge 34a', a trailing edge 34b', and a radially outer surface 34c'. The trailing edge 34b' has a ramped surface similar to the ramped surface of the leading edge 34a and 34a'. The surface 34c' increases in diameter from the leading edge 34a' to a point approximately midway between the leading edge 34a' and the trailing edge 34b', after which point it decreases in diameter to the trailing edge 34b'. After the locking ring 16 and the second conduit 14 have been locked to the first conduit 12', the locking ring 16 and the second conduit 14 may be unlocked or released from the first conduit 12' by rotating the locking ring 16 in a disengaging direction 38. A force is applied to the locking ring 16 to rotate the locking tab 48 in the disengaging direction 38 beyond the trailing edge 34b' and engage the outer surface 34c'. The second conduit 14 remains stationary as the locking ring 16 is rotated because the alignment tab 50 retains the second conduit 14 in relation to the first conduit 12 by engaging with a surface 27b in the alignment slot 27. As the locking ring is rotated, the locking ring 16 deforms radially outwardly, which allows the locking tab 48 to travel along the radially outer surface 34c' to a position beyond the trailing edge 34b', where the locking ring 16 returns to its original orientation and the locking tab engages with the inside surface 22. The locking tab 48 is now interposed between the cam lock member 34' and the locking aperture 26 and is then rotated further to travel along the ramped surface 28, along with the other locking tabs 48 to the respective locking apertures 26 and removed from the first conduit 12.

The ramped surfaces 28 are designed such that the sealing bead 54 is compressed by the same predetermined distance, substantially equal to the thickness 24 of the first flange 18, each time the locking ring 16 and second conduit 14 are attached to the first conduit 12 or 12'. This consistency ensures that the connection between the conduits 12 or 12' and 14 is repeatable and thus the connection remains airtight for a substantial number of engagement and disengagement cycles.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A twist lock assembly for connecting a pair of fluid conducting conduits, comprising:
   a first conduit having an open end with an annular first flange extending radially outwardly therefrom, said first flange having an alignment slot and at least one locking slot formed therein;
   a second conduit having an open end with an annular second flange extending radially outwardly therefrom, said second flange having a radially inwardly extending alignment tab formed thereon; and
   a locking ring rotatably mounted on said second flange and having at least one radially inwardly extending locking tab formed thereon,
   whereby when said first and second flanges are positioned in an abutting and concentric relationship, said alignment tab engages said alignment slot and said at least one locking tab is aligned with said at least one locking slot, rotation of said locking ring relative to said second flange draws said first and second flanges into airtight engagement and locks said conduits together for fluid flow therethrough.

2. The twist lock assembly according to claim 1 wherein said second conduit is flexible.

3. The twist lock assembly according to claim 1 wherein said first conduit has an opposite end adapted to be attached to one of an air cleaner, a resonator, and a throttle body.

4. The twist lock assembly according to claim 1 including a sealing surface formed on each of said first and second flanges, said sealing surfaces mating when said first and second flanges are locked together.

5. The twist lock assembly according to claim 4 wherein a sealing bead is formed on a one of said sealing surfaces.

6. The twist lock assembly according to claim 5 wherein said sealing bead has a generally semicircular cross section.

7. The twist lock assembly according to claim 1 wherein said at least one locking slot has a ramped surface.

8. The twist lock assembly according to claim 1 wherein said first flange has two additional locking slots formed therein, said locking slots being equally spaced about said first flange, and said locking ring has two additional radially inwardly extending locking tabs formed thereon, said locking tabs being equally spaced about said locking ring for engagement with corresponding ones of said locking slots.

9. The twist lock assembly according to claim 1 including a stop member extending outwardly from said first flange for engagement with said at least one locking tab.

10. The twist lock assembly according to claim 1 including a cam locking member extending outwardly from said first flange for engagement with said at least one locking tab.

11. The twist lock assembly according to claim 1 wherein said locking ring releasably locks said conduits together for fluid flow therethrough.

12. A twist lock assembly for connecting an air supplying conduit to an air receiving engine component in a vehicle, comprising:
   an air receiving engine component having a first conduit with an air inlet opening;
   a first annular flange attached to said air receiving conduit and surrounding said opening, said first flange having an alignment slot and at least one locking slot formed therein;
   a second conduit having an open end;
   a second annular flange attached to said open end of said second conduit and having a radially inwardly extending alignment tab formed thereon; and
   a locking ring rotatably mounted on said second flange and having at least one radially inwardly extending locking tab formed thereon,
   whereby when said first and second flanges are abutting and concentric and said alignment tab engages said alignment slot and said at least one locking tab is aligned with said at least one locking slot, rotation of said locking ring relative to said second flange draws said first and second flanges into airtight engagement and locks said open end of said second conduit to said inlet opening of said first conduit of said engine component.

13. The twist lock assembly according to claim 12 wherein said second conduit is flexible.

14. The twist lock assembly according to claim 12 wherein said engine component is a one of an air cleaner, a resonator, and a throttle body.

15. The twist lock assembly according to claim 12 including a generally planar sealing surface formed on each of said first and second flanges, said sealing surfaces adapted to seal against one another.

16. The twist lock assembly according to claim 15 wherein a sealing bead having a generally semicircular cross section is formed on a one of said sealing surfaces.

17. The twist lock assembly according to claim 12 wherein said locking ring releasably locks said open end of said second conduit to said inlet opening of said first conduit of said engine component.

18. The twist lock assembly according to claim 12 including a cam lock member extending outwardly from said first flange for engagement with said at least one locking tab, said cam lock member having a ramped surface angled radially outwardly from a leading edge to a trailing edge thereof.

19. The twist lock assembly according to claim 12 including a cam lock member extending outwardly from said first flange for engagement with said at least one locking tab, said cam lock member having a ramped surface angled radially outwardly from leading and trailing edges thereof.

20. A twist lock assembly for connecting an air supplying conduit to an air receiving conduit, comprising:
   an air receiving conduit with an air inlet opening and an annular radially outwardly extending first flange at said inlet opening, said first flange having an alignment slot and a plurality of locking slots formed therein and a first sealing surface formed thereon;
   a second conduit having an open end and an annular radially outwardly extending second flange at said open end, said second flange having a radially inwardly extending alignment tab and a second sealing surface formed thereon; and
   a locking ring rotatably mounted on said second flange and having a plurality of locking tabs formed thereon,
   whereby when said alignment tab is engaged with said alignment slot and each of said locking tabs is engaged with a corresponding one of said locking slots by rotation of said locking ring in an engaging direction, said first and second sealing surfaces are held in airtight engagement.

* * * * *